United States Patent [19]

Cunningham

[11] Patent Number: 4,943,086

[45] Date of Patent: Jul. 24, 1990

[54] GAS BAG INFLATOR WITH A TWO WELDED JOINT HOUSING

[75] Inventor: Donald J. Cunningham, North Ogden, Utah

[73] Assignee: Morton Thiokol, Inc., Chicago, Ill.

[21] Appl. No.: 374,426

[22] Filed: Jun. 30, 1989

[51] Int. Cl.$^5$ .............................................. B60R 21/26
[52] U.S. Cl. .................................................... 280/741
[58] Field of Search ............... 280/728, 734, 736, 738, 280/740, 741, 742; 102/370; 180/274

[56] References Cited

U.S. PATENT DOCUMENTS

| | | | |
|---|---|---|---|
| 4,203,787 | 5/1980 | Kirchoff et al. | 149/35 |
| 4,316,874 | 2/1982 | Kasama et al. | 280/741 |
| 4,369,079 | 1/1983 | Shaw | 280/728 |
| 4,530,516 | 7/1985 | Adams et al. | 280/741 |
| 4,547,342 | 10/1985 | Adams et al. | 280/741 |
| 4,561,675 | 12/1985 | Adams et al. | 280/741 |

Primary Examiner—Charles A. Marmor
Assistant Examiner—Tamara L. Finlay
Attorney, Agent, or Firm—Gerald K. White

[57] ABSTRACT

A vehicle inflatable crash protection bag inflator. The inflator housing comprises two structural components which are welded together by only two welded joints to define an inner or combustion chamber containing gas generant material and an outer or diffuser chamber. An igniter tube is disposed in the combustion chamber free of attachment to one of the structural components and is press fit or otherwise suitably attached to a mounting post on the other structural component. The igniter tube is perforated and wrapped with a foil whereby the igniter material is disposed in direct contact with a squib to better ensure ignition thereof. Alternatively, the igniter tube and igniter material may be eliminated and the gas generant material disposed in direct closely surrounding relation to the squib. The housing is composed of aluminum, and the inflator has a minimum weight and size.

40 Claims, 2 Drawing Sheets

GAS BAG INFLATOR WITH A TWO WELDED JOINT HOUSING

The present invention relates to inflators or gas generators that utilize the combustion of a solid fuel gas generant composition for the generation of a gas for purposes such as rapidly inflating vehicle inflatable crash protection bags, commonly called air bags.

Many forms of gas generators or inflators that utilize combustible solid fuel gas generant compositions for the inflation of inflatable crash protection bags are known. One such inflator is disclosed in U.S. Pat. No. 4,547,342 to Adams et al., which is assigned to the assignee of the present applicatin and which is incorporated herein by reference. Adams et al. discloses an inflator wherein the housing construction comprises first and second aluminum structural components or shells, specifically, a first or diffuser shell and a second or base shell. Both shells ar forged, heat treated, and then final machined. The first structural component or diffuser shell has three integrally formed concentric cylinders which form the inflator structural walls and define chambers therein containing the solid fuel or gas generant, ignition materials, and filters, and provide exit openings or port holes for passage of the inflation gases from chamber to chamber and into the protective air bag. The second sturctural component or base shell contains an electric initiator and attachment flange and also provides three concentric mating surfaces for the concentric cylinders of the diffuser shell. The three concentric cylinders of the diffuser shell are simultaneously joined to the concentric mating surfaces of the base shell by three respective welds in a single inertial welding operation.

While the Adams et al. inflator permits the use of lightweight aluminum in the housing construction for a lighter weight and reliable crash bag inflation system, there is room for improvement, as discussed hereinafter, so that such inflators may be more easily manufactured, even lighter and with less volume, and even more reliable, The provision of three simultaneously inertia welded joints, as in the Adams et al. inflator, requires prescise dimensioning of the cylinders to insure that all three joints are adequately formed.

The igniter material for the Adams et al. inflator is contained within an ignition cup whereby the squid must fire through the ignition cup for ignition thereof. The ignition cup is a closed aluminum container which the squib must fire into and pierce. In such an inflator, squibs have been provided which fire only in a single direction into the ignition cup, i.e., out the end of the squib. Since the inner cylinder of the Adams et al. inflator, which defines the ignition chamber, is structural and must therefore be strong enough to withstand the welding operation, there is a limit to the number of apertures that can be provided therein for routing of ignition gases into the adjacent combustion chamber while maintianing stuctural integrity. It is desirable in order to provide a more diffused pattern of gas flow into the combustion chamber for better ignition to provide a greater number of apertures in the igniter chamber wall.

In keeping with the emphasis on weight reduction in automobiles, it remains desirable to further decrease the weight as well as the overall size of inflators.

It is therefore an object of the present invention to provide an inertia welded aluminum inflator of decreased weight and volume.

It is another object of the present invention to provide such an inflator wherein the welding operation may be performed more easily and with greater assurance of weld integrity.

It is a further object of the present invention to provide such an inflator wherein there is a more diffused pattern of ignition gases into the combustion chamber for improved ignition.

In order to achieve the above objects, in accordance with the present invention there is provided an inflator which has two structural components which are connected by only two welded joints. The igniter material container is free of attachment to one of the structural components to thereby permit a greater number of apertures to be provided therein for a more diffused pattern of gas flow into the combustion chamber and to permit the container to be wrapped with an aluminum foil prior to its assembly so that an ignition cup for the igniter powder may be eliminated whereby the initiator or squib may fire directly into the igniter powder in order to better insure ignition thereof. Alternatively, the igniter material container and igniter powder may be eliminated so that the initiator or squib is in direct contact with the gas generant meterial for ignition thereof.

The above and other objects, features, and advantages of this invention will be apparent in the following detailed description of the preferred embodiments thereof which is to read in connection with the accompanying drawings.

DETAILED DESCRIPTION OF THE PREFERRED EMBODIMENT

Figure 1:
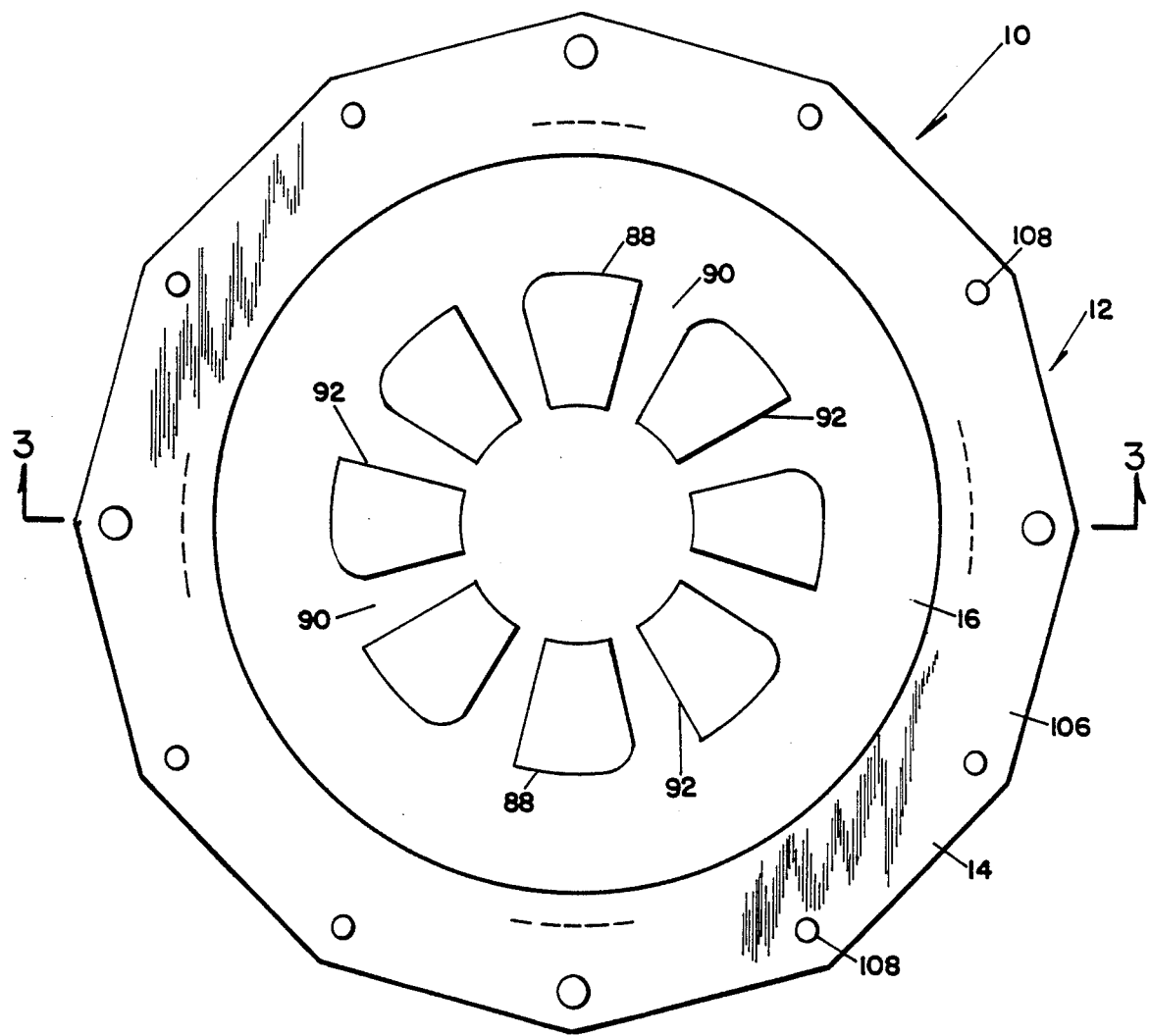
FIG. 1 is a top plan view of an improved inflator embodying the present invention.
Figure 2:
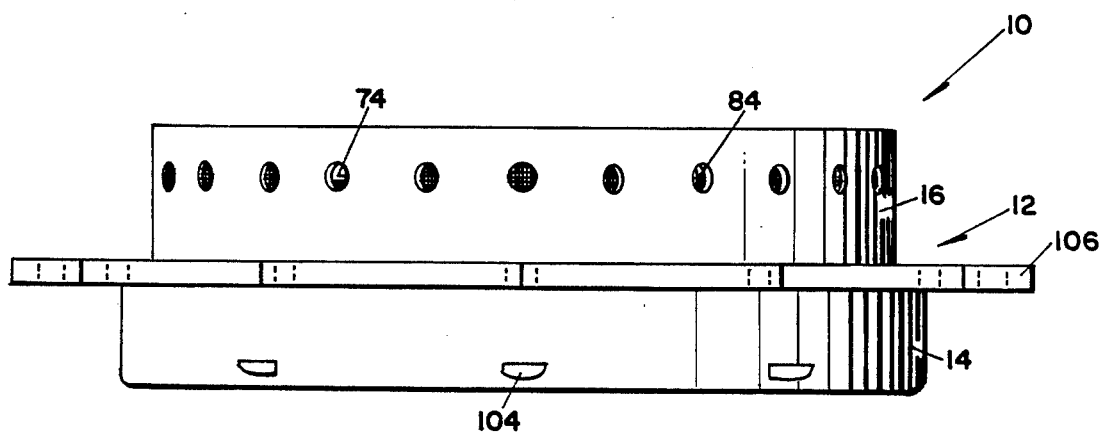
FIG. 2 is an elevation view thereof.

Referring to the drawings, there is shown generally at 10 an inflator or gas generator which may be used to provide gas for rapidly inflating vehicle inflatable crash protection bags, i.e., commonly knonw as gas bags or air bags. The inflator 10 has a generally cylindrical external outline and includes a housing construction 12 comprising the two structural components. These structural components are a lower or first component 14 and an upper or second component 16 each of which is composed of aluminum to provide light weight. Components 14 and 16 are joined by two concentric inertia welds illustrated at 18 and 20 to form the housing construction 12 of the inflator assembly 10. These two welds 18 and 20 are performed simultaneously in a single inertia welding operation. The process of inertia welding is more specifically described in the aforesaid Adams et al. patent.

The lower component or base 14 may be formed by forging or impact extruding or other suitable means and has one cylinder 22 which mates with and is inertia welded to a mating surface 24 on the upper component 16 at weld 18 to define a first chamber which may be called a combustion chamber 26 therewithin. The upper component 16 may be formed by forging or impact extruding or other suitable means and has a cylinder 28 which is concentric with and outwardly of cylinder 22 and which mates with a mating surface 30 on the base 14 and is welded thereto by weld 20 to define a toroidal second chamber which may be called a diffuser chamber 32 between the inner and outer cylinders 22 and 28 respectively in which the gas is cooled and filtered. However, it should be understood that, in accordance with the present invention, either structural component may include each cylinder which is accordingly welded to a mating surface on the other structural component. It is preferred that the base 14 include the inner cylinder 22 in order that all of the pyrotechnics may be loaded in the base 14 for easier inertia welding as will become more apparent hereinafter. It is also preferred that the upper component 16 include the outer cylinder 28 in order that the weld 20 of the outer cylinder 28 to the base 14 may help to hold the screen pack in the diffuser chamber 32, to be discussed hereinafter, in place.

The base component 14 is formed to have a generally cylindrical member or knob 34 which serves as a mounting post protruding inwardly therefrom centrally of the combustion chamber 26. A thin tubular member 36, which may be called an ignition tube, is press fit or otherwise suitably attached or mounted over the cylindrical surface of the mounting post 34 and extends substantially to but short of the upper component 16 so that it is spaced therefrom, and its upper end is closed by a suitable cap-like member 38 of aluminum or other suitable material, which may be press fit therein after loading of ignition material, to define an ignition chamber 40 centrally of the combustion chamber 26 and to prevent spillage of ignition material 50 during subsequent assembly operations. Thus, although the ignition tube 36 is attached to the lower or first structural component which is attached by the welds to the upper or second structural component, the ignition tube 36 is free of attachment to the upper or second structural component 16 whereby the first and second structural components 14 and 16 respectively are connected by only two welded joints whereby the inertial welding operation may be simplified for easier manufacture of the inflator 10. The ignition tube 36 is composed of stainless or carbon steel or other suitable material which can withstand the heat in the ignition chamber 40.

Figure 3:
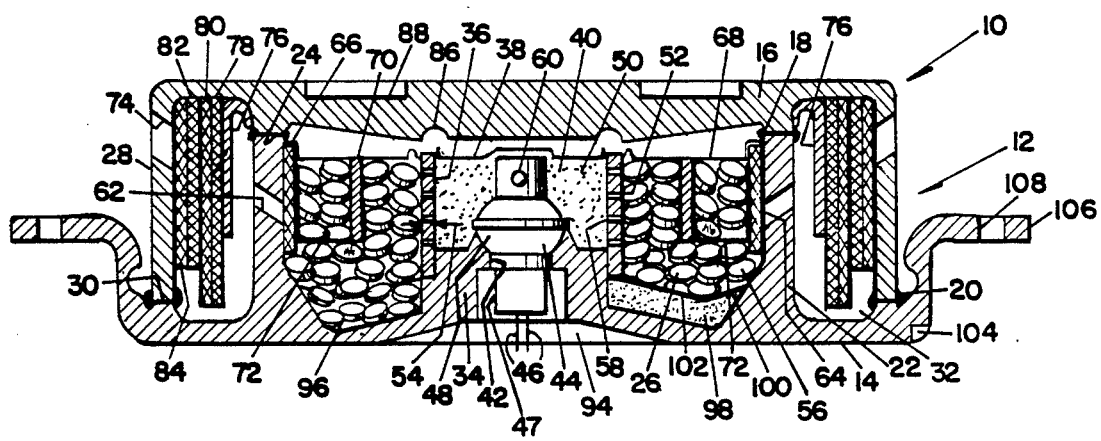
FIG. 3 is a cross-sectional view thereof taken along the lines 3—3 of FIG. 1.

Extending through a central aperture 42 of the knob 34 is a conventional initiator or squib 44 which is energized by electrical current flowing through a pair of energizing electrical leads 46 connected thereto by connector 47 and which are adapted for plug-in connection to external crash sensor means (not shown) for electrically energizing thereof upon the occurrence of a crash. Contained within the squib 44 to be ignited by the electrical current flowing through a suitable bridge or resistance wire in contact therewith is a suitable pyrotechnic material such as black powder or that described hereinafter for use as igniter material 50. The squib 44 firs through apertures 60. An initiator or squib is defined, for the purpose of this specification and the claims, as a device which contains a pyrotechnic material in contact with a bridge or electrical resistance wire for producing sparks or hot gases for igniting other pyrotechnic material. The squib 44 includes a conical portion 48 which rests on a similarly shaped surface of the central aperture 42 and is suitably held therein such as by a portion of the knob 34 which is crimped, as shown in FIG. 3, and the squib 44 extends therefrom into the ignition chamber 40.

Contained within the ignition chamber 40 and around the squib 44 is a charge of igniter material 50. Although various pyrotechnic materials may be employed for the igniter material 50, a preferred material is a granular mixture of 25% by weight of boron and 75% of potassium nitrate. This mixture has been found to burn with a very hot flame that is suitable for igniting the solid fuel gas generant material 56 in the combustion chamber 26, which is to be described hereinafter.

It is desirable that the squib 44 fire directly into the ignition material so as to provide increased reliability of ignition. Since the ignition tube 36, which contains a plurality of perforations 58 for directing ignition gases into the combustion chamber 26, is not a structural component and may thus be press fit on the mounting post 34, it may be easily wrapped, before it is press fit on the mounting post 34, with a layer of aluminium foil 52 to maintain the integrity of the ignition material 50 within the ignition chamber 40. Foil 52 may also be provided to allow a momentary pressure build-up within the ignition chamber 40 of perhaps 1 millisecond prior to break-out and combustion chamber ignition. With the ignition tube thusly wrapped, the ignition material 50 need not be contained within a separate container or ignition cup in the ignition chamber but may instead, in accordance with a preferred embodiment of the present invention, by contained in the ignition chamber 40 closely adjacent to the squib 44 without any membrane between the squib and ignition material through which the squib must first fire. Thus, the ignition material 50 is in direct contact with the squib 44 so as to reduce the chances of ignition failure from having to fire through a membrane into ignition material.

The ignition chamber of the Adams et al. patent is defined by a third or inner cylinder which is inertia welded to a mating surface. In order that such a cylinder withstand the welding process it may typically have a thickness of 0.15 inch and have a minimum number of apertures therein for directing ignition gases into the combustion chamber so that the structural integrity thereof may be maintained. Such a thickness of material adds to the overall weight of the inflator.

In order to maintain the overall weight of the inflator 10 at a minimum in accrodance with the present invention, the ignition tube 36 has a thickness illustrated at 54 preferably of less than 0.07 inch, more preferably less than 0.05 inch, such as about 0.03 inch, sufficient to prevent rupture and to allow press fitting onto the mounting post 34. For example, in order to not unnecessarily add additional weight to the inflator 10, the ignition tube 36 may have a thickness 54 of perhaps 0.029 inch. However, it is believed that the thickness 54 should not be less than about 0.022 inch in order to have enough thickness for press fitting onto the mounting post 34 and to prevent rupture thereof.

Contained within the combustion chamber 26 are uniformly distributed pellets 56 of a gas generant composition which may be any one of a number of compositions meeting the requirements of burning rate, nontoxicity, and flame temperature. One composition that may be utilized is that described in U.S. Pat. No. 4,203,787 to Fred E. Schneiter and George F. Kirchoff. Another composition that may advantageously be utilized is that described in U.S. Pat. No. 4,369,079 to Graham C. Shaw. Both of these patents, which are assigned to the assignee of the present invention, are incorporated herein by reference. Furthermore, the gas generant material may be in other suitable forms other than pellets, for example, wafers.

The plurality of perforations 58 are provided in the ignition tube 36 for routing of ignition gases from ignition of the igniter material 50 from the ignition chamber 40 into the combustion chamber 26 for igniting the gas generant 56 therein. In order to provide a more diffused pattern of gas flow into the combustion chamber 26 for better ignition of the gas generant material 56 therein in accordance with an aspect of the present invention, a large number of small diameter perforations 58, such as perhaps 96 such perforations ordered in four circumferential rows, are provided in the ignition tube instead of the small number of apertures which would be allowed in the ignition tube if it were a structural component of the housing as in the inflator of the Adams et al. patent. Since the perforated ignition tube 36 is not a structural component which is inertia welded, the number of perforations 58 may be increased therein as hereinbefore discussed without concern of it becoming too weak for welding.

Since the inflator 10 of the present invention does not require the squib 44 to fire into a membrane containing ignition material and since the ignition material is directly in contact therewith, the squib 44 is preferably provided with a plurality such as perhaps three apertures 60 around its circumference for better and more rapid initiation of the igniter material 50.

A plurality of apertures 62 are contained in the inner cylinder 22 around the circumference thereof for routing of gases generated in the combustion chamber 26 into the diffuser chamber 32. In order to hermetically seal the combustion chamber 26 against moisture, an aluminum foil 64 or other suitable material is applied to the inner surface of the inner cylinder 22 over the apertures 62 therein. A generally cylindrical cooling and filtering screen 66 is positioned in the combustion chamber 26 adjacent the aluminum foil 64 and covering the apertures 62 for cooling and filtering of the gas of combustion of the pellets 56 prior to its entering the diffuser chamber 32. Screen 66 is composed of three wraps of 18 mesh stainless steel screen or other suitable material. An aluminum member or retainer disc 68 rests on the screen 66 and is press fit into the combustion chamber 26 after gas generant loading to retain the gas generant material 56 therein to prevent spillage thereof during subsequent assembly operations.

A baffle or inner deflector ring 70, of aluminum or other suitable material, may optionally be positioned in the combustion chamber 26 concentric with the inner cylinder 22 to deflect ignition gases as they pass through apertures 58 so that a blow-torch effect of the ignition gases on the screen 66 may be prevented. The baffle may be positioned and held in tension by spot welding a plurality of perhaps three clips 72 to the baffle 70 and to the screen 66. The baffle 70 is spaced from the bottom of the combustion chamber 26 to allow pellets 56 to be sufficiently distributed all the way to the bottom thereof.

Contained within the outer cylinder 28 are a plurality of apertures or ports 74 spaced around the circumference thereof for routing generated gas from the diffuser chamber 32 into a gas bag (not shown).

The upper or second structural component 16 includes a deflector ring 76 extending downwardly therefrom and in front of the apertures 62 but spaced from the inner cylinder 22 to absorb heat from the generated hot gases and deflect the generated gases entering the diffuser chamber 32 downwardly so that they do not directly impact the screen and filter pack described hereinafter but instead follow a more convoluted path to the apertures 74 for a more tortuous path through the screen and filter pack for better filtering. The deflector ring 76, which is generally cylindrical in form and concentric with the inner cylinder 22, has an inwardly curved end portion which is press fit to an inwardly protruding portion of the upper component 16 which defines the inner mating surface 24. Between the deflector ring 76 and the outer cylinder 28 is positioned a screen and filter pack which comprises, beginning at the deflector ring 76, one wrap 78 of 8 mesh aluminum screen, one wrap 80 of Sikafil filter material, sold by Newmat Krebsoge of West Germany, which includes a 40 mesh stainless steel back-up screen, one wrap 82 of a suitable ceramic paper, and finally two wraps 84 of 30 mesh stainless steel screen. The screen and filter pack is provided for cooling and filtering the generated gas so that clean gas may be provided to the gas bag. Any other suitable filter pack may alternatively be provided. The particular compositions for the filter screen 66 and the screen and filter pack are dependent upon the performance requirements of the inflator 10, i.e., bag inflation time, gas analysis, and particulate residue requirements.

In order to ensure adequate strength near the center of the inflator 10 to compensate for not having a third stength providing cylinder defining the ignition chamber, structural components 14 and 16 are each provided with an increased thickness near the center thereof. For example, the thickness of the upper or diffuser component may be perhaps about 0.25 inch at the center thereof. Circumferential groove 86 is provided in the inner surface of the upper component 16 to ensure adequate clearance between the upper component 16 and the ignition tube 36 and cap member 38 during the inertia welding process. Outwardly of the groove 86 the upper component 16 has an increased thickness of perhaps 0.325 inch afterwhich it tapers to a thickness of perhaps about 0.225 inch at the outer periphery of the combustion chamber 26. In the areas of cut-outs 88 to be described hereinafter, these thicknesses are reduced by the depth of the cut-outs to reduce weight while maintaining stength. The portion of the lower structural component 14 forming the lower wall of the combustion chamber 26 has an increased thickness of perhaps 0.25 inch. The inner cylinder 22 has a thickness of perhaps 0.175 inch. The outer cylinder 28 has a thickness of perhaps 0.105 inch.

In order to reduce the weight added by the increased thickness of the upper structural component 16 as well as to provide for fixturing of the upper component 16 in an inertia welding device for spinning thereof, a plurality of weight reducing cut-outs or notches 88 of perhaps 8 are previded in the outer surface of the upper component 16 generally above the combustion chamber 26. These cut-outs 88, which have a depth of perhaps 0.125 inch, are spaced apart circumferentially to define ribs 90 therebetween for retaining the increased strength provided by the increased thickness of the upper component 16. These cut-outs 88 are provided with straight leading edges 92 for attachment of an inertia welding tool for spinning of the upper component 16 in a clockwise direction, as the inflator is viewed in FIG. 1.

In order to further reduce the inflator weight, a cut-out or notch 94 is provided centrally of the outer surface of the lower structural component 14, and a plurality of perhaps 8 cut-outs pockets 96 are provided in the inner surface of the lower structural component 14 along the bottom of the combustion chamber 26 and spaced apart circumferentially to define ribs therebetween for retaining strength in the lower structural component 14. These cut-outs 96 and their corresponding ribs are similar in dimensions to the cut-outs 88 and ribs 90 in the upper component 16, except cut-outs 96 are more triangular in shape. In addition to allowing an overall weight reduction, cut-outs 96 provide additional volume for the gas generant pellets 56, as shown on the left side of FIG. 3, so that the overall height of the inflator 10 may be reduced.

An auto ignition device 98, similar to the device disclosed in U.S. Pat. No. 4,561,675 to Adams et al. which is assigned to the assignee of the present invention and which is hereby incorporated herein by reference, is disposed in one of the cut-outs 96, as shown on the right-hand side of FIG. 3. As more fully discussed in the Adams et al. '675 patent, the purpose of the auto ignition device is to ignite the pyrotechnics, i.e., pellets 56 and igniter material 50, at a temperature which is lower than their own ignition temperatures in case of an automobile or warehouse fire but which is substantially higher than the ambient temperature range to which the inflator is normally subjected so as to prevent ignition of the pyrotechnics when the inflator housing is at a temperature wherein the aluminum of the housing structure has degraded and may tend to rupture or burst. The auto ignition device 98 comprises a suitable pyrotechnic material 100 such as a suitable gunpowder which may be enclosed in a suitable pouch shaped to fit the cut-out 96 and covered by a suitable foil 102 such as aluminum foil. Alternatively, the pyrotechnic material 100 may be poured into the cut-out 96 and the aluminum foil tape 102 placed over it. The providing of the auto ignition device 98 in one of the cut-outs 96 so that it is adjacent the gas generant material 56 allows firing of the auto ignition device 98 into the gas generant pellets 56 for desirably lower and slower ignition thereof than would occur if an auto ignition device was placed adjacent the ignition material 50.

A plurality of perhaps 8 weight reducing notches 104 are provided in the outer surface of the lower structural component 14 and spaced circumferentially about the outer periphery thereof for fixturing thereof within an inertia welding device.

The base or lower structural component 14 includes an interface attachment flange 106 having a plurality of apertures 108 therein spaced circumferentially thereabout for attachment of the inflator 10 to a vehicle the occupants of which are to be protected. The attachment flange 106 may be of any suitable configuration dependant upon the interface requirements.

The overall diameter of the upper structural component may typically by approximately 4.09 inch, roughly equivalent to that of the inflator shown in the aforesaid Adams et al. '342 patent. However, for substantially the same amount of pyrotechnics and performance, the overall height of inflator 10, which may typically be about 1.375 inch, may be on the order of 0.2 inch less than the overall height of the inflator disclosed in the Adams et al. '342 patent. In addition, the weight of inflator 10 of the present invention may be typically 513 grams as compared to a typical wight of 585 grams for an inflator as disclosed in the Adams et al. '342 patent in contain substantially the same amount of pyrotechnics. Thus, an inflator 10 according to the present invention may advantageously have reduced weight and volume.

The inflator 10 is welded in the wholly loaded condition. The squib 44 is inserted into the aperture 42 and suitably secured thereto such as by crimping over a portion or the knob 34 forming the aperture 42. The aluminum foil 52 is secured to the outer surface of the ignition tube 36 afterwhich the ignition tube is press fit on the mounting post 34. The ignition tube 36 is then filled with igniter material 50 being poured in direct contact with the squib 44, and the cap member 38 is press fit into the ignition tube 36 to prevent spillage during subsequent operations. The aluminum foil 64 is attached to the inner cylinder 22 along its inner surface to cover apertures 62, and the auto ignition device 98 is positioned in one of the cut-outs 96. The baffle 70 is secured in tension to the screen 66 by the spot welding of clips 72 to the baffle 70 and to the screen 66 afterwhich the screen 66 and baffle 70 are inserted into the combustion chamber 26 with the screen adjacent the foil 64 and tight against the inner cylinder 22. Gas generant pellets 56 are then poured into the combustion chamber 26 afterwhich retainer disc 68 is press fit in the inner cylinder 22 to rest on screen 66 to prevent spillage of the pellects 56 during subsequent assembly operations. The deflector ring is press fit in the upper component 16 between the inner mating surface 24 an the outer cylinder 28. The screen and filter pack 78, 80, 82, and 84 is positioned in the upper structural component 16 between the deflector ring 76 and the outer cylinder 28. During the inertia welding operation, the base component 14 is held stationary in the inertia welding machine by means of notches 104. The upper or diffuser component 16 is held in the inertia welding machine by means of notches 88 and is rotated above the base component 14 to a speed typically of about 3000 rpm. Upon the attainment of such speed, the clutch is actuated to disconnect the power source, and the freely spinning upper component 16 is lowered to bring the inner mating surface 24 into contact with the inner cylinder 22 and to bring the outer cylinder 28 into contact with the outer mating surface 30. The resulting friction stops the spinning of the upper component 16 in a fraction of a second but raises the temperature at the areas of contact sufficiently to cause consolidation thereat of the metal of the lower and upper components 14 and 16 respectively. Pressure is maintained for a short period, for example, a second or two, to allow the welds 18 and 20 to solidify.

Functioning of the inflator 10 begins with an electrical signal from a crash sensor (not shown) to the squib or initiator 44. The squib 44 fires into the ignition chamber 40 igniting the igniter material 50. The igniter material 50 burns, and the hot gases produced thereby pass through the perforations 58 in the ignition tube 36 and burst through the aluminum foil 52 after a short delay of perhaps 1 millisecond and into the combustion chamber 26 to ignite the gas generant material 56 therein. The inflator gases produced by the ignition of the gas generant 56 flow through the combustion chamber screen 66 where they are initially cooled and filtered afterwhich they burst through the aluminum foil 64 and pass through the apertures 62 into the diffuser chamber 32. The inflator gases are cooled and redirected by the deflector ring 76 downwardly and are then passed upwardly through the filter pack 78, 80, 82, and 84 for filtering and cooling thereof afterwhich they are routed out of the inflator 10 through apertures 74 into a gas bag (not shown) for inflation thereof.

Figure 4:
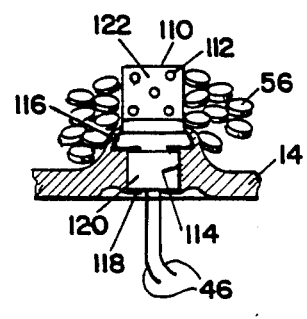
FIG. 4 is an elevation view of an alternative embodiment of the ignition means for the inflator.

The elimination of a third cylinder within the inner cylinder 22 and attached to the first and second structural components 14 and 16 respectively furthermore permits the elimination of the ignition tube 36 and the igniter material 50 whereby the gas generant 56 may be disposed in direct closely surrounding relation to the squib, i.e., there is no membrane or partition between the squib and gas generant material, and the squib may fire directly into the gas generant 56, as illustrated in FIG. 4. This allows a further reduction in inflator weight and size and a less complex inflator structure. As shown in FIG. 4, squib 110, which is similar to squib 44, is provided with a larger housing 122 having substantially the same height and a larger diameter of perhaps 0.5 inch and containing perhaps 0.5 gram of a suitable pyrotechnic material such as the previously discussed mixture of boron and potassium nitrate. Housing 122 has an increased number of apertures 112 of perhaps up to about 10 for more uniform ignition of the gas generant 56 which is in direct contact therewith. Squib 110 extends through a central aperture 114 of lower structural component 14 to protrude into the combustion chamber 26 in contact with the gas generant 56 and is held in the central aperture 114 by a crimped portion 116 on the lower structural component 14 which overlaps and engages a conical portion thereof. The squib 110 is connected to electrical energizing lines 46 by connector 120 which is held in place by crimped portion 118 on the lower structural component 14. Thus, in an inflator according to the embodiment of FIG. 4, the squib 110 fires through apertures 112 directly into the gas generant pellets 56 to thus eliminate the ignition tube 36 and igniter material 50 of FIG. 3.

It is to be understood that the invention is by no means limited to the specific embodiments which have been illustrated and described herein and that various modifications thereof may indeed by made which come within the scope of the present invention as defined by the appended claims.

I claim:

1. A vehicle inflatable crash protection bag inflator comprising first and second structural components, one of said first and second structural components including a first cylinder which is welded to a mating surface on the other of said structural components to define a first chamber, one of said first and second structural components including a second cylinder which is welded to a mating surface on the other of said structural components and which is concentric with and outwardly of said first cylinder to define a second chamber between said first and second cylinders, a solid gas generant composition disposed in said first chamber and operable upon ignition to produce gas, means including a perforated tubular member within said first chamber and igniter material within said tubular member for igniting said solid gas generant composition which igniting means is free of attachment to one of said structural components, said first and second structural components connected by only two welded joints, aperture means in said first cylinder for directing gas produced in said first chamber into said second chamber, means in said second chamber for filtering the gas, and outlet port means in said second cylinder for flow of the gas out of the inflator.

2. An inflator according to claim 1 wherein said first and second structural components are composed of aluminum.

3. An inflator according to claim 2 wherein said first and second structural components include generally parallel first and second plate members respectively, the inflator further comprising a charge of auto ignition material disposed in said first chamber adjacent one of said structural component plate members and adjacent said gas generant composition.

4. An inflator according to claim 1 wherein said first and second structural components include generally parallel circular first and second plate members respectively, the inflator further comprises a plurality of strengthening rib means in the inner surface of one of said structural component plate members and each of which rib means extends toward the center of said one of said structural component plate members between said first cylinder and said tubular member to define a plurality of pockets in which additional solid gas generant composition may be disposed.

5. An inflator according to claim 4 wherein said first and second structural components are composed of aluminum, and the inflator further comprises a charge of auto ignition material disposed in one of said pockets and means for holding said charge of auto ignition material in said one of said pockets.

6. An inflator according to claim 1 wherein said tubular member has a thickness which is less than about 0.07 inch.

7. An inflator according to claim 1 wherein said tubular member has a thickness which is less than about 0.05 inch.

8. An inflator according to claim 1 wherein said first sturctural component includes said first cylinder which is welded to a mating surface on said second structural component to define said first chamber, said second structural component includes said second cylinder which is welded to a mating surface on said first structural component to define said second chamber between said first and second cylinders, and said igniting means is free of attachment to said second stuctural component and is attached to said first structural component.

9. An inflator according to claim 8 wherein said first and second structural components are composed of aluminum and include generally parallel first and second plate members respectilvely, the inflator further comprising a charge of auto ignition material disposed in said first chamber adjacent said first structural component plate member and adjacent said gas generant composition.

10. An inflator according to claim 8 wherein said first and second structural components include generally parallel circular first and second plate members respectilvely, the inflator further comprises a plurality of strengthening rib means in the inner surface of said first structural components plate member and each of which rib means extends toward the center of said first structural component plate member between said first cylinder and said tubular member to define a plurality of pockets in which additional gas generant composition may be disposed.

11. An inflator according to claim 10 wherein said first and second structural components are composed of aluminum, and the inflator further comprises a charge of auto ignition material disposed in one of said pockets and means for holding said charge of auto ignition material in said one of said pockets.

12. A vehicle inflatable crash protection bag inflator comprising first and second structural components, one of said first and second structural components including a first cylinder which is welded to a mating surface on the other of said structural components to define a first chamber, one of said first and second structural components including a second cylinder which is welded to a mating surface on the other of said structural components and which is concentric with and outwardly of said first cylinder to define a second chamber between said first and second cylinders, a generally tubular member having a thickness less than about 0.07 inch which is within said first chamber and generally concentric with said first cylinder and one end of which engages one of said first and second structural components and the other end of which is spaced from the other of said structural components whereby said first and second structural components may be connected by only two welded joints, means for closing said tubular member other end, a solid gas generant composition disposed in said first chamber and operable upon ignition to produce gas, igniter material disposed in said tubular member, means for igniting said igniter material to produce gas for igniting said solid gas generant composition, a plurality of perforation means in said tubular member for directing the gas produced therein out of said tubular member for igniting said solid gas generant compsition, foil means for covering said perforation means until said igniter material is ignited, initiator means in direct contact with said igniter material for igniting said igniter material, aperture means in said first cylinder for directing gas produced in said first chamber into said second chamber, means in said second chamber for filtering the gas, and outlet port means in said second cylinder for flow of the gas out of the inflator.

13. An inflator according to claim 12 wherein said tubular member has a thickness which is less than about 0.05 inch.

14. An inflator according to claim 13 wherein said first and second structural components are composed of aluminum.

15. An inflator according to claim 12 wherein said tubular member is composed of steel and has a thickness which is equal to about 0.03 inch.

16. An inflator according to claim 12 wherein said first and second structural components further include first and second generally parallel plate members respectively, and one of said first and second structural component plate members further includes a generally cylindrical mounting post extending inwardly thereof and onto which said one end of said tubular member is press fit, and said tubular member closing means comprises a cap member press fit into said other end of said tubular member.

17. An inflator according to claim 12 wherein said first and second structural components are composed of aluminum.

18. An inflator according to claim 17 wherein said first and second structural components include generally parallel first and second plate members respectively, the inflator further comprising a charge of auto ignition material disposed in said first chamber adjacent one of said first and second structural component plate members and outwardly of said tubular member.

19. An inflator according to claim 12 wherein said initiator means includes a generally cylindrical housing and a plurality of apertures spaced circumferentially in said housing for releasing hot gases for igniting said igniter material.

20. An inflator according to claim 12 wherein said first structural component includes said first cylinder which is welded to a mating surface on said second structural component to define said first chamber, said second structural component includes said second cylinder which is welded to a mating surface on said first structural component to define said second chamber between said first and second cylinders, and said tubular member is free of attachment to said second structural component and is attached to said first sturctural component.

21. An inflator according to claim 20 wherein said first and second structural components are composed of aluminum and include generally parallel first and second plate members respectively, the inflator further comprising a charge of auto ignition material disposed in said first chamber adjacent said first structural component plate member and outwardly of said tubular member.

22. An inflator according to claim 20 wherein said first and second structural components include generally parallel circular first and second plate members respectively, the inflator further comprises a plurality of strengthening rib means in the inner surface of said first structural component plate member and each of which rib means extends toward the center of said first structural component plate member between said first cylinder and said tubular member to define a plurality of pockets in which additional gas generant composition may be disposed.

23. A vehicle ilnflatable crash protection bag inflator comprising first and second structural components including first and second generally parallel circular plate members respectively, one of said first and second structural components further including a first cylinder which is welded to a mating surface on the other of said structural components to define a first chamber, one of said first and second structural components further including a second cylinder which is welded to a mating surface on the other of said structural components and which is concentric with and outwardly of said first cylinder to define a second chamber between said first and second cylinders, means within said first cylinder for containing igniter material which means is free of attachment to said second structural component whereby said first and second structural components may be connected by only two welded joints, a solid gas generant composition disposed in said first chamber and operable upon ignition to produce gas, means including igniter material disposed in said igniter material containing means for ignition of said solid gas generant composition, means for igniting said igniter material, aperture means in said first cylinder for directing gas produced in said first chamber into said second chamber, means in said second chamber for filtering the gas, outlet port means in said second cylinder for flow of the gas out of the inflator, and a plurality of strengthening ribs in the outer surface of said second circular plate member intermediate the edge and center thereof and each of which extends toward the center of the second circular plate member to define a plurality of slots between said ribs respectively providing means for attachment of a tool for holding said second structural member for welding of said first and second cylinders to said respective structural components.

24. An inflator according to claim 23 wherein said first and second structural components are composed of aluminum.

25. An inflator according to claim 24 further comprising a charge of auto ignition material disposed in said first chamber adjacent said first structural component plate member and adjacent said gas generant composition.

26. An inflator according to claim 23 further comprising a plurality of strengthening rib means in the inner surface of said first structural component plate member and each of which strengthening rib means extends toward the center of said first structural component plate member between said first cylinder and said igniter material containing means to define a plurality of pockets in which additional solid gas generant composition may be disposed.

27. An inflator according to claim 26 wherein said first and second structural components are composed of aluminum, and the inflator further comprises a charge of auto ignition material disposed in one of said pockets and means for holding said charge of auto ignition material in said one of said pockets.

28. An inflator according to claim 23 wherein said first structural component includes said first cylinder which is welded to a mating surface on said second structural component to define said first chamber, and said second structural component includes said second cylinder which is welded to a mating surface on said first structural component to define said second chamber between said first and second cylinders.

29. A vehicle inflatable crash protection protection bag inflator comprising first and second structural components, said first structural component including a first cylinder which is welded to a mating surface on said second structural component to define a first chamber, said second structural component including a second cylinder which is welded to a matilng surface on said first structural component and which is concentric with and outwardly of said first cylinder to define a second chamber between said first and second cylinders, means within said first cylinder for containing igniter material which means is free of attachment to said second structural component, said first and second structural components connected by only two welded joints, a solid gas generant composition disposed in said first chamber and operable upon ignition to produce gas, means including igniter material disposed in said igniter material containing means for ignition of said solid gas generant composition, means for igniting said igniter material, aperture means in said first cylinder for directing gas produced in said first chamber into said second chamber, means in said second chamber for filtering the gas, and outlet port means in said second cylinder for flow of the gas out of the inflator.

30. A vehicle inflatable crash protection bag inflator comprising first and second structural components, said first structural component including a first cylinder which is welded to a mating surface on said second structural component to define a first chamber, said second structural component including a second cylinder which is welded to a mating surface on said first structural component and which is concentric with and outwardly of said first cylinder to define a second chamber between said first and second cylinders, a generally tubular member having a thickness less than about 0.07 inch which is within said first chamber and generally concentric with said first cylinder and one end of which engages said first structural component and the other end of which is spaced from said second structural component whereby said first and second structural components may be connected by only two welded joints, means for closing said tubular member other end, a solid gas generant composition disposed in said first chamber and operable upon ignition to produce gas, igniter material disposed in said tubular member, means for igniting said igniter material to produce gas for igniting said solid gas generant composition, a plurality of perforation means in said tubular member for directing the gas produced therein out of said tubular member for igniting said solid gas generant composition, foil means for covering said perforation means until said igniter material is ignited, means in direct contact with said igniter material for igniting said igniter material, aperture means in said first cylinder for directing gas produced in said first chamber into said second chamber, means in said second chamber for filtering the gas, and outlet port means in said second cylinder for flow of the gas out of the inflator.

31. A vehicle inflatable crach protection bag inflator comprising first and second structural components, one of said first and second structural components including a first cylinder which is welded to a matilng surface on the other of said structural components to define a first chamber, one of said first and second structural components including a second cylinder which is welded to a mating surface on the other of said structural components and which is concentric with and outwardly of said first cylinder to define a second chamber between said first and second cylinders, a squib disposed at least partially in said first chamber and mounted to one of said first and second structural components and spaced from the other of said structural components, gas generant material disposed in said first chamber in direct closely surrounding relation to said squib whereby the squib may fire directly into the gas generant material and the first and second structural components may be connected by only two welded joints, aperture means in said first cylinder for directing gas produced in said first chamber into said second chamber, means in said second chamber for filtering the gas, and outlet port means in said second cylinder for flow of the gas out of the inflator.

32. An inflator according to claim 31 wherein said first and second structural components are composed of aluminum.

33. An inflator according to claim 32 wherein said first and second structural components include generally parallel first and second plate members respectively, the inflator further comprising a charge of auto ignition material disposed in said first chamber adjacent one of said structural component plate members.

34. An inflator according to claim 31 wherein said first and second structural components include generally parallel circular first and second plate members respectively, the inflator further comprises a plurality of strengthening rib means in the inner surface of one of said stuctural component plate members and each of which rib means extends toward the center of said one of said structural component plate members between said first cylinder and said squib to define a plurality of pockets in which additional solid gas generant composition may be disposed.

35. An inflator according to claim 34 wherein said first and second structural components are composed of aluminum, and the inflator further comprises a charge of auto ignition material disposed in one of said pockets and means for holding said charge of auto ignition material in said one of said pockets.

36. A vehicle inflatable crach protection bag inflator comprising first and second structural components, said first structural component including a first cylinder which is welded to a mating surface on said second structural component to define a first chamber, said second structural component including a second cylinder whichg is welded to a mating surface on said first structural component and which is concentric with and outwardly of said first cylinder to define a second chamber between said first and second cylinders, a squib disposed at least partially in said first chamber and mounted to said first structural component and spaced from the second structural component, gas generant material disposed in said first chamber in direct closely surrounding relation to said squib whereby the squib may fire directly into the gas generant material and the first and second structural components may be connected by only two welded joints, aperture means in said first cylinder for directing gas produced in said first chamber into said second chamber, means in said chamber for filtering the gas, and outlet port means in said second cylinder for flow of the gas out of the inflator.

37. An inflator according to claim 36 wherein said first and second structural components are composed of aluminum and include generally parallel first and second plate members respectively, the inflator further comprising a charge of auto ignition material disposed in said first chamber adjacent said first structural component plate member.

38. An inflator according to claim 36 wherein said first and second structural components include generally parallel circular first and second plate members respectively, the inflator further comprises a plurality of strengthening rib means in the inner surface of said first structural component plate member and each of which rib means extends toward the center of said first structural component plate member between said first cylinder and said squib to define a plurality of pockets in which additional gas generant composition may be disposed.

39. An inflator according to claim 38 wherein said first and second structural components are composed of aluminum, and the inflator further comprises a charge of auto ignition material disposed in one of said pockets and means for holding said charge of auto ignition material in said one of said pockets.

40. An inflator according to claim 36 further comprising a plurality of strengthening ribs in the outer surface of said second circular plate member intermediate the edge and center thereof and each of which extends toward the center of the second circular plate member to define a plurality of slots between said ribs respectively providing means for attachment of a tool for holding said second structural member for welding of said first and second cylinders to the second and first structural components respectively.

* * * * *

UNITED STATES PATENT AND TRADEMARK OFFICE
CERTIFICATE OF CORRECTION

PATENT NO. : 4,943,086

DATED : July 24, 1990

INVENTOR(S) : Cunningham

It is certified that error appears in the above-identified patent and that said Letters Patent is hereby corrected as shown below:

column 1, line 15, "applicatin" should be -- application --.

column 1, line 42, "able," should be -- able. --.

column 1, line 48, "squid" should be -- squib --.

column 2, line 27, "meterial" should be -- material --.

column 3, line 8, "sturctural" should be -- structural --.

column 3, line 56, "firs" should be -- fires --.

column 4, line 27, "by" should be -- be --.

column 7, line 1, "cut-outs pockets" should be -- cut-outs or pockets --.

column 7, line 56, "by" should be -- be --.

column 7, line 65, "wight" should be -- weight --.

column 7, line 66, "in" should be -- to --.

column 10, line 35, "sturctural" should be -- structural --.

column 10, line 57, "components" should be -- component --.

column 11, lines 27 and 28, "compsi-tion" should be -- composition --.

column 13, line 38, "matilng" should be -- mating --.

column 13, line 56, "crach" should be -- crash --.

column 14, line 22, "crach" should be -- crash --.

column 14, line 25, "matilng" should be -- mating --.

UNITED STATES PATENT AND TRADEMARK OFFICE
CERTIFICATE OF CORRECTION

PATENT NO. : 4,943,086
DATED : July 24, 1990
INVENTOR(S) : Cunningham

It is certified that error appears in the above-identified patent and that said Letters Patent is hereby corrected as shown below:

column 15, line 4, "crach" should be -- crash --.

column 15, line 10, "whichg" should be -- which --.

column 15, line 23, "said chamber" should be -- said second chamber --.

Signed and Sealed this

Twenty-fifth Day of January, 1994

BRUCE LEHMAN

Attest:

Attesting Officer

Commissioner of Patents and Trademarks